(12) United States Patent
Kong et al.

(10) Patent No.: US 10,260,387 B2
(45) Date of Patent: Apr. 16, 2019

(54) ENGINE OIL SUPPLY SYSTEM

(71) Applicant: SUZHOU CLEVA PRECISION MACHINERY & TECHNOLOGY CO., LTD, Suzhou (CN)

(72) Inventors: Zhao Kong, Suzhou (CN); Ning Guo, Suzhou (CN); Gan Chen, Suzhou (CN); Keya Feng, Suzhou (CN)

(73) Assignee: Suzhou Cleva Precision Machinery & Technology Co., Ltd, Suzhou (CN)

( * ) Notice: Subject to any disclaimer, the term of this patent is extended or adjusted under 35 U.S.C. 154(b) by 138 days.

(21) Appl. No.: 14/568,130

(22) Filed: Dec. 12, 2014

(65) Prior Publication Data
US 2015/0096840 A1 Apr. 9, 2015

Related U.S. Application Data

(63) Continuation of application No. PCT/CN2013/000617, filed on May 27, 2013.

(30) Foreign Application Priority Data

Jun. 15, 2012 (CN) .......................... 2012 1 0198804

(51) Int. Cl.
| F01M 11/00 | (2006.01) |
| --- | --- |
| F01M 11/06 | (2006.01) |
| F02B 63/02 | (2006.01) |
| F01M 1/04 | (2006.01) |
| F16N 7/32 | (2006.01) |

(52) U.S. Cl.
CPC ............ *F01M 11/062* (2013.01); *F01M 1/04* (2013.01); *F01M 11/064* (2013.01); *F01M 11/065* (2013.01); *F02B 63/02* (2013.01); *F16N 7/32* (2013.01); *F01M 2011/007* (2013.01); *F01M 2011/0075* (2013.01)

(58) Field of Classification Search
CPC ..... F01M 2011/007; F01M 2011/0075; F01M 11/062; F01M 11/064

See application file for complete search history.

(56) References Cited

U.S. PATENT DOCUMENTS

| 2,022,898 | A | * | 12/1935 | Niven | ................ | F01M 11/0004 |
| | | | | | | 184/6.2 |
| 2,440,815 | A | * | 5/1948 | Wharam | .............. | F01M 11/065 |
| | | | | | | 184/103.1 |
| 3,211,256 | A | * | 10/1965 | Teutsch | .................. | F01M 11/04 |
| | | | | | | 123/195 R |
| 4,103,665 | A | * | 8/1978 | Prasch | ................. | F01M 11/065 |
| | | | | | | 123/196 CP |

(Continued)

*Primary Examiner* — Minh Truong
(74) *Attorney, Agent, or Firm* — Schwegman Lundberg & Woessner, P.A.

(57) ABSTRACT

The present invention discloses an engine oil supply system, which includes an oil pan for storing lubricating oil. An oil suction pipe is disposed in the oil pan, the oil suction pipe is twisted in the oil pan, and at least two oil suction portions are disposed on the oil suction pipe, so that at least one oil suction portion is below a lubricating oil level when the engine is in any position. The technical solution disclosed by the present invention can ensure that the lubricating oil can enter each part of the engine for lubrication through the oil supply system when the engine is used either in a leant or inverted manner.

5 Claims, 6 Drawing Sheets

(56) References Cited

U.S. PATENT DOCUMENTS

| | | | |
|---|---|---|---|
| 6,260,534 B1* | 7/2001 | Kampichler | F02F 7/00 123/196 R |
| 6,776,262 B2* | 8/2004 | Hur | F01M 11/064 123/196 R |
| 7,114,483 B2* | 10/2006 | Lee | F01M 1/04 123/196 R |
| 8,146,561 B2* | 4/2012 | Pryor | F01M 1/12 123/196 R |
| 9,341,115 B2* | 5/2016 | Grillo | F01M 11/067 |
| 2009/0235894 A1* | 9/2009 | Lee | F01M 1/04 123/196 CP |
| 2011/0056452 A1* | 3/2011 | Horner | F01M 11/0004 123/188.4 |

* cited by examiner

ENGINE OIL SUPPLY SYSTEM

CROSS REFERENCE TO RELATED APPLICATIONS

This application is a continuation of PCT/CN2013/000617 filed May 27, 2013, which claims priority to CN 201210198804.8 filed Jun. 15, 2012, both of which are incorporated herein by reference.

TECHNICAL FIELD

The present invention relates to an engine oil supply system.

BACKGROUND ART

When an engine works, lubricating oil is used to lubricate relevant parts of the engine. Therefore, a four-stroke engine is usually equipped with a lubricating oil tank to store the lubricating oil. The lubricating oil in the lubricating oil tank is supplied to the engine through an oil supply system. An oil suction device is usually disposed in the lubricating oil tank. The lubricating oil is outputted through the oil suction device. A small-sized four-stroke engine is usually used in existing gardening tools. It is also equipped with a lubricating oil tank and it also needs to add proper lubricating oil in the lubricating oil tank. Due to the special requirements of the gardening tools, the small-size four-stroke engine needs to work normally when it is used in a leant and even inverted manner. Therefore, the engine needs to work normally at any position; meanwhile, its lubricating system needs to work normally as well.

There are multiple lubricating systems on the existing small-size four-stroke engine provided, as well as multiple lubricating oil tank structures thereof. The typical one is a four-stroke engine disclosed in U.S. Pat. No. 6,213,079. As shown in FIG. 1, an oil-taking portion 40 is disposed in a lubricating oil tank 18; the oil-taking portion 40 includes a hose tube 42 and a back balance 43; an oil suction opening is disposed on the back balance 43; when the engine is leant or inverted, the back balance 43 will roll towards the leant or inverted direction; therefore, the back balance 43 will roll towards the accumulating direction of the lubricating oil, so as to keep the oil suction opening below the lubricating oil level. However, the structure has the defects that if there are other obstacles in the lubricating oil tank, for example, such structures as bulging portion, reinforcing rib and the like, the back balance 43 may be possibly obstructed by the obstacles, and cannot be immersed below the lubricating oil level, so that the lubricating oil cannot be sucked, which may cause damage to the engine.

SUMMARY OF THE INVENTION

In order to solve the foregoing problems, the present invention provides an engine oil supply system which can ensure that the lubricating oil can enter each part of the engine for lubrication through the oil supply system when the engine is used either in a leant or inverted manner, wherein the engine oil supply system is achieved through the following technical solution.

An engine oil supply system includes an oil pan for storing lubricating oil. An oil suction pipe is disposed in the oil pan, the oil suction pipe is twisted in the oil pan, and at least two oil suction portions are disposed on the oil suction pipe, so that at least one oil suction portion is below a lubricating oil level when the engine is in any position.

Preferably, only one oil suction pipe is disposed.

Preferably, two oil suction pipes are disposed, which are respectively a first oil suction pipe and a second oil suction pipe, and the two oil suction pipes are communicated through a connecting pipe.

Preferably, the oil supply system further comprises an oil supply passage, the oil supply passage is provided with an oil supply opening, and the connecting pipe is communicated with the oil supply opening.

Preferably, the oil suction pipe is twisted on the bottom surface of the oil pan Preferably, the oil supply system comprises a connecting pipe, and the connecting pipe is communicated with the oil suction pipe.

Preferably, the connecting pipe is made of a flexible material.

Preferably, the oil suction portion is an oil suction hole disposed on the oil suction pipe.

Preferably, the oil pan consists of a cylinder block and a lower cover.

Preferably, the oil suction pipe is in a bent shape when being twisted in the oil pan.

According to the oil supply system of the present invention, the oil suction pipe is disposed in the oil pan through a twisting manner, so that the oil suction pipe can bypass obstacles in the oil pan, and ensure that the lubricating oil can be supplied to the engine through an oil suction mechanism when the engine is either leant or inverted.

DETAILED DESCRIPTION OF THE PREFERRED EMBODIMENTS

The present invention will be further described hereinafter with reference to the specific embodiments.

Figure 1:
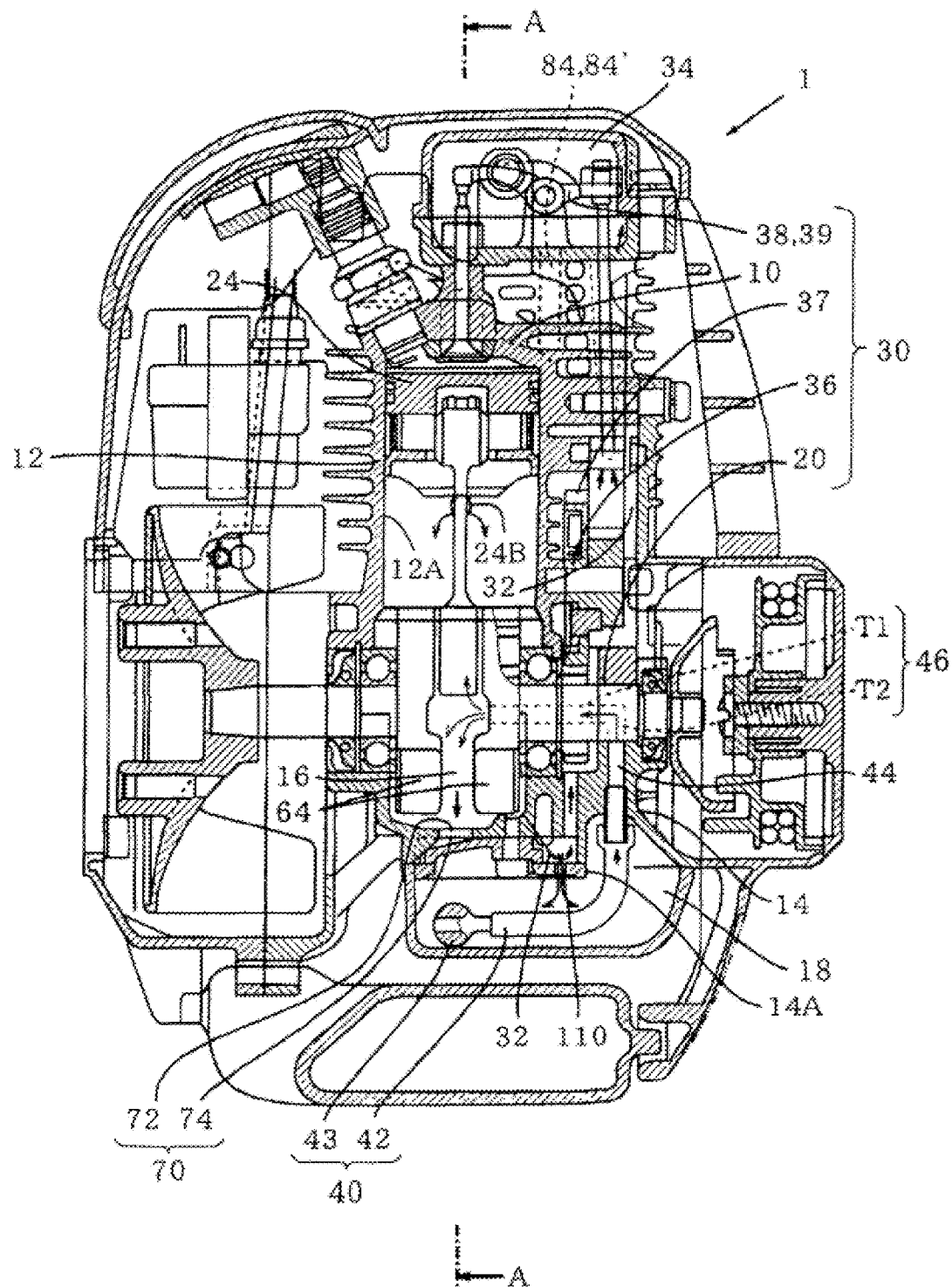
FIG. 1 is a schematic view of an engine of the prior art.
Figure 2:
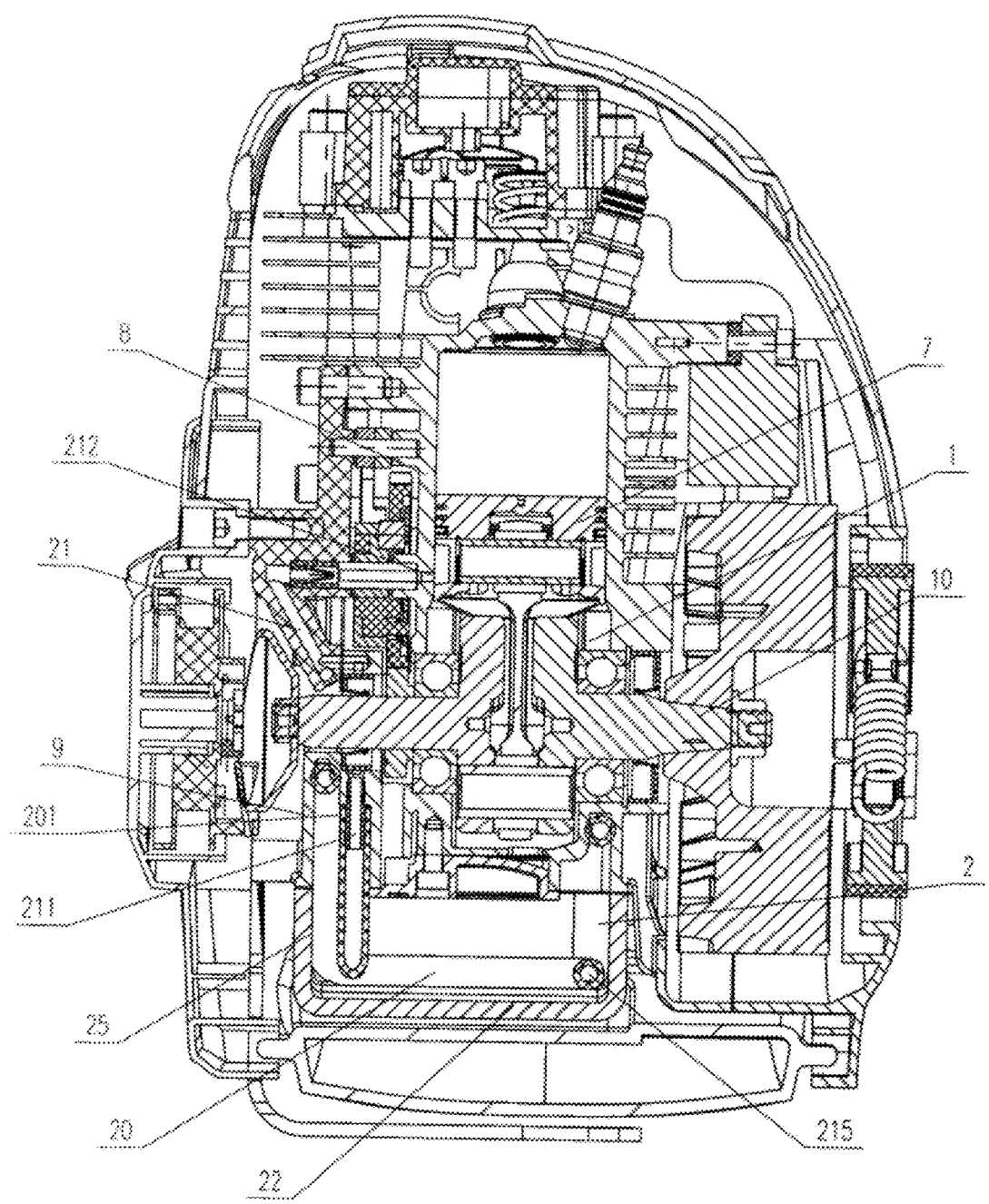
FIG. 2 is a schematic view of an engine of an embodiment of the present invention.
Figure 3:
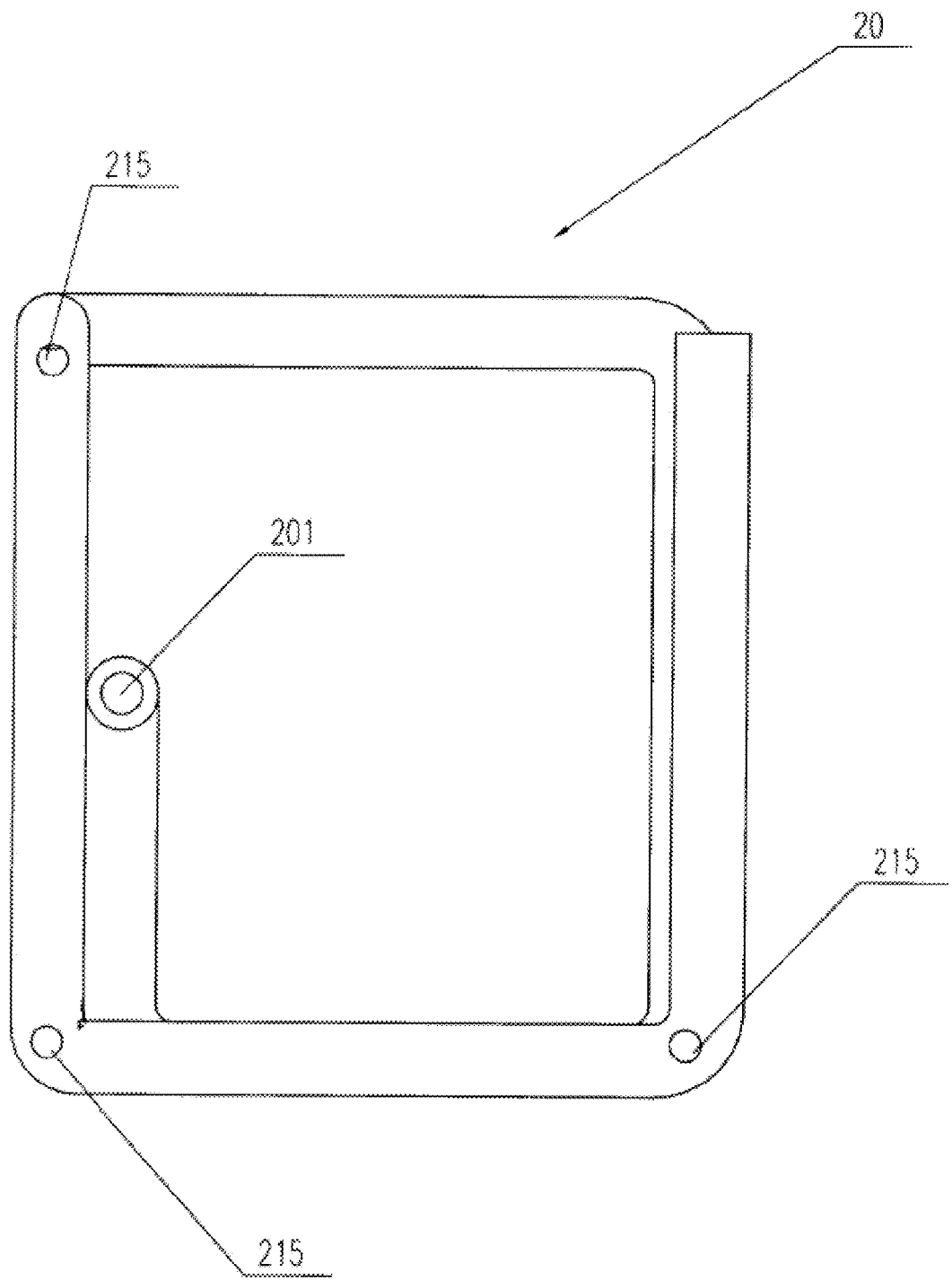
FIG. 3 is a schematic view of an oil suction pipe of the embodiment of the present invention.

FIG. 2 and FIG. 3 show a four-stroke engine according to a preferred embodiment of the present invention, which includes a crankcase 1, an oil pan 2, a cam box, a rocker chamber and an air filter. The oil pan 2 is used for storing lubricating oil; the crankcase 1 is disposed above the oil pan 2; a crank shaft 10 is disposed in the crankcase 1 and is jointed with a piston 7 in a cylinder 8. The oil pan 2 and the crankcase 1 are communicated through an oil supply passage 21. The oil supply passage 21 is provided with an oil supply opening 211 in the oil pan 2. The oil supply opening 211 downwards stretches into the oil pan 2 from a cylinder block 9. The oil supply passage 21 is provided with an oil nozzle 212 on the inner wall of the cylinder 8. Lubricating oil enters the crankcase 1 through the oil nozzle. The oil pan 2 is spliced by a lower cover 22 and the cylinder block 9. The oil pan is a cube approximately. An oil suction mechanism is disposed in the oil pan 2. The oil suction mechanism is connected with the oil supply passage 21. The oil suction mechanism includes an oil suction pipe 20. The oil suction pipe 20 is twisted in the oil pan 2. The oil suction pipe 20 can be a material having certain hardness. When the oil suction pipe 20 is being twisted, the oil suction pipe bends and extends by surrounding the periphery of the oil pan. The oil suction pipe 20 when being twisted may be close to the inner wall 25 of the oil pan. When the inside of the oil pan has obstacles, the oil suction pipe may bypass the obstacles and be twisted. A plurality of oil suction portions are disposed on the oil suction pipe 20. Preferably, the oil suction portions may be oil suction holes 215 directly opened on the wall of the oil suction pipe, so that at least one oil suction hole is immersed below the lubricating oil level when the engine is used in any gesture, so as to ensure that an engine lubricating system can operate normally. One end of the oil suction pipe 20 is provided with an interface end 201. The interface end 201 is communicated with the oil supply opening 211 of the oil supply passage. In the embodiment, the oil pan 2 is a cube approximately. In order to ensure that the oil suction mechanism can suck oil normally when the engine is inverted or leant, at least each top corner of the oil pan is provided with at least one oil suction portion when the oil suction pipe is being twisted. The shape of the oil pan 2 differs with different engine structures. Therefore, when the oil suction pipe is being twisted, at least one oil suction portion is disposed below the lubricating oil level when the engine is in any position. When the piston 7 moves, the pressure in the crankcase 1 changes alternatively. When the pressure in the crankcase is smaller than the pressure in the oil pan, the lubricating oil in the oil pan enters the oil suction pipe 20 through the oil suction portion. The lubricating oil passes through the oil suction pipe and enters the oil supply passage 21, and then the lubricating oil enters the crankcase to lubricate the crankcase. The lubricating oil will flow in the engine through the engine lubricating system to sufficiently lubricate each part of the engine.

Figure 4:
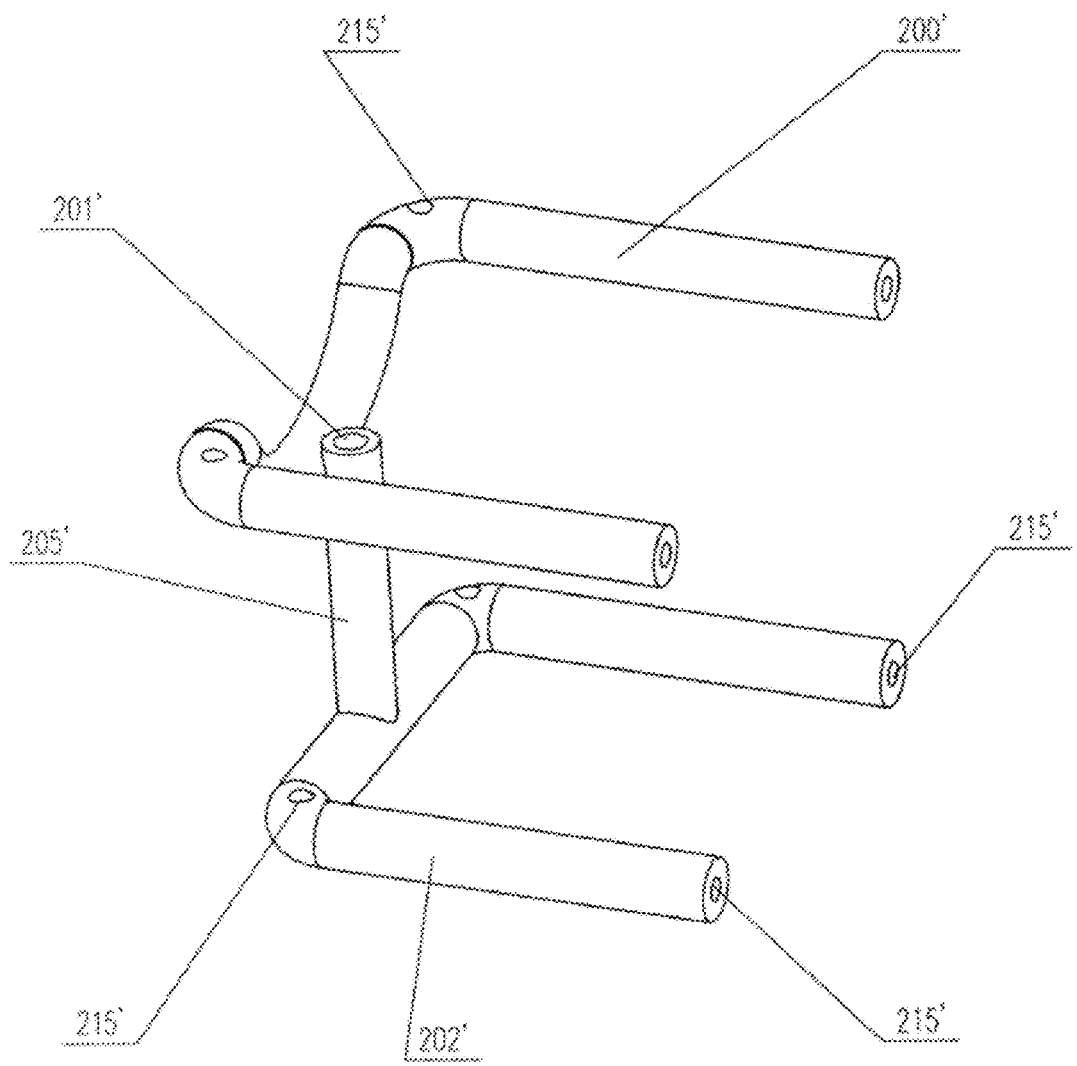
FIG. 4 is a schematic view of an oil suction pipe of a second embodiment of the present invention.

FIG. 4 shows a second embodiment of the oil suction mechanism of the present invention. The oil suction mechanism includes two oil suction pipes, which are respectively a first oil suction pipe 200' and a second oil suction pipe 202'. Oil suction portions are disposed on the first oil suction pipe and the second oil suction pipe. As shown in FIG. 4, four oil suction holes 215' are respectively disposed on the first oil suction pipe and the second oil suction pipe, so that each top corner of the oil pan has one oil suction hole 215'. The first oil suction pipe and the second oil suction pipe are distributed in the space of the oil pan 2, so that at least one oil suction hole 215' is below the oil level when the engine works in any position. The first oil suction pipe 200' and the second oil suction pipe 202' are communicated through a connecting pipe 205'. The first and the second oil suction pipes are respectively located at the opposite positions of the two ends of the connecting pipe 205'. An interface end 201' is disposed on the 205' and connected with the oil supply passage 21. The difference between the embodiment and the first embodiment is that two oil suction pipes which are mutually communicated are used in the embodiment and disposed in the oil pan.

Figure 5:
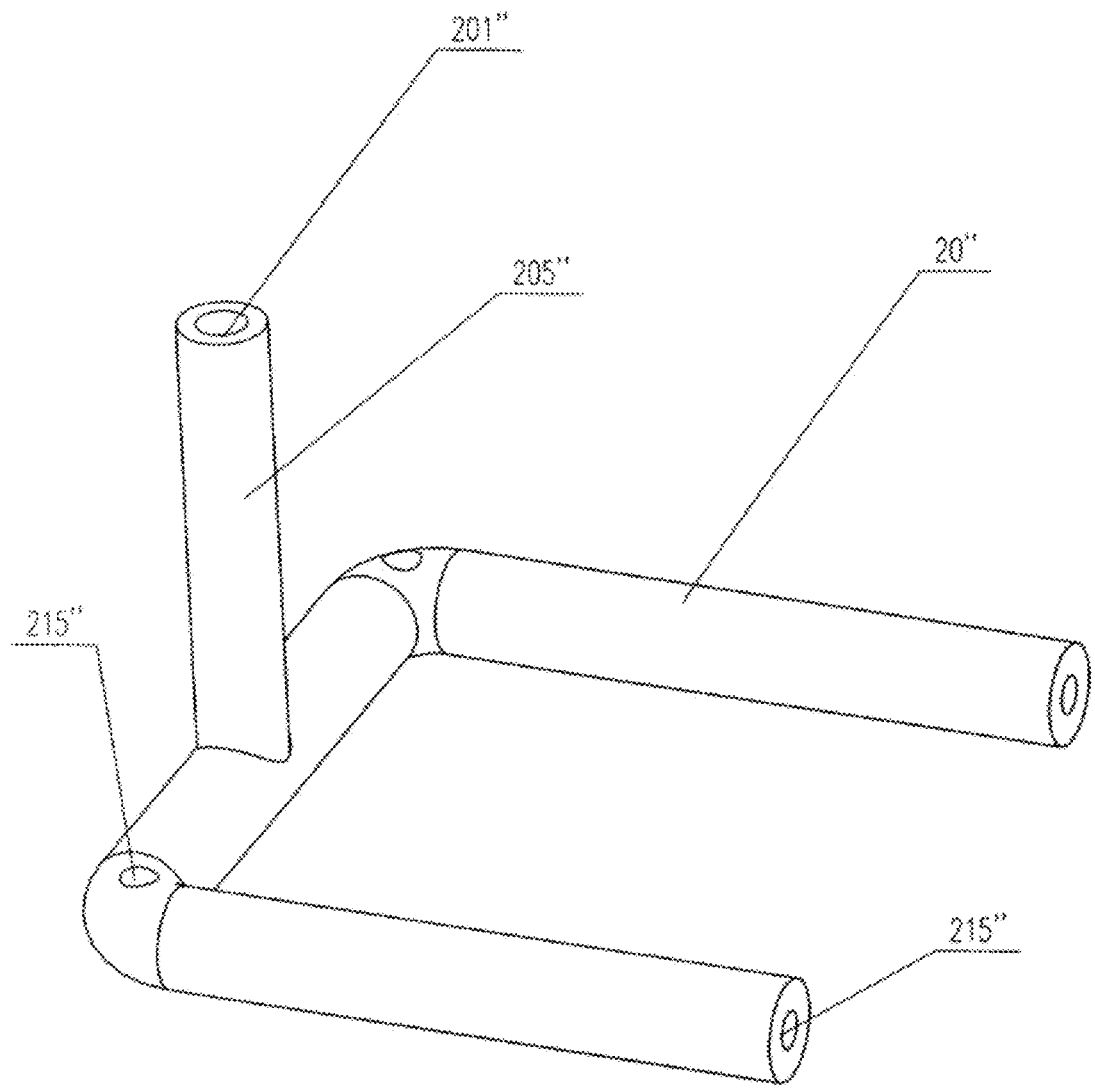
FIG. 5 is a schematic view of an oil suction pipe of a third embodiment of the present invention.
Figure 6:
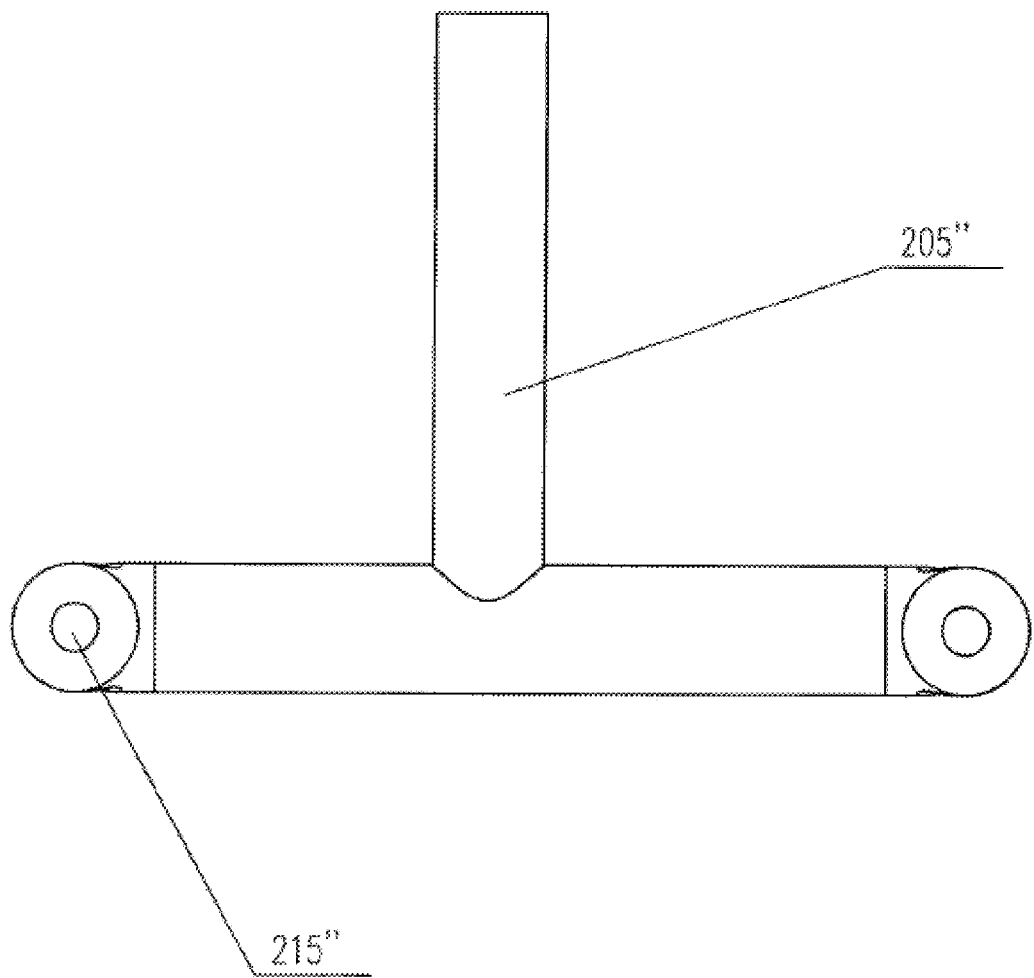
FIG. 6 is a schematic view of the third embodiment of the present invention.

FIG. 5 and FIG. 6 show the third embodiment of the present invention. In the embodiment, an oil suction pipe 20" is approximately U-shaped, and four oil suction holes 215" are disposed on the oil suction pipe. The oil suction pipe may be twisted on one plane in the oil pan. A connecting pipe 205" is disposed on the oil suction pipe. An interface end 201" on the connecting pipe 205" is connected with the oil supply passage 21. The connecting pipe 205" is made of a flexible material. Therefore, when the engine is inverted or leant, the gravity action of the oil suction pipe 20" causes the connecting pipe 205" to be deformed. Therefore, the oil suction pipe 20" can slide in the oil pan by relying on its own gravity. For example, when the engine is upright, the crankcase is disposed above the oil pan (as shown in FIG. 2). The oil pan is divided into an upper bottom surface and a lower bottom surface. The upper and lower bottom surfaces are two opposite surfaces. At this time, the lubricating oil is covered above the lower bottom surface, and the oil suction pipe 20" is twisted on the lower bottom surface of the oil pan and is immersed below the oil level. When the engine is used in an inverted manner, the oil pan is disposed above the crankcase. At this time, the lubricating oil is accumulated above the upper bottom surface. Due to the deformation of the connecting pipe 205", the oil suction pipe 20" slides from the lower bottom surface to the upper bottom surface by relying on its own gravity. Therefore, the oil suction pipe can still be kept below the lubricating oil level.

According to the oil supply system disclosed by the present invention, the oil suction pipe of the oil supply system can bypass obstacles in the oil pan; meanwhile, the oil suction portion on the oil suction pipe can ensure to suck the lubricating oil when the engine is either leant or inverted, thus ensuring the normal operation of the engine. The foregoing embodiments are merely preferred embodiments of the technical solution of the present invention, and other embodiments shall also fall within the protection scope of the present invention without departing from the spirit of the present invention.

We claim:

1. An engine oil supply system, comprising an oil pan for storing lubricating oil, wherein an oil suction pipe is disposed in the oil pan, the oil suction pipe is twisted in the oil pan, the oil suction pipe is configured to further twist to bypass an obstacle inside of the oil pan, and at least two oil suction portions are disposed on the oil suction pipe, so that at least one oil suction portion is below a lubricating oil level, wherein the oil pan is spliced by a lower cover and a cylinder block, and wherein the oil suction pipe extends adjacent to an inner wall of the oil pan and extends in a horizontal plane to surround an entire inner periphery of the oil pan.

2. The engine oil supply system according to claim 1, wherein only one oil suction pipe is disposed.

3. The engine oil supply system according to claim 1, wherein the oil suction portion is an oil suction hole disposed on the oil suction pipe.

4. The engine oil supply system according to claim 3, wherein the oil suction pipe is in a bent shape when being twisted in the oil pan.

5. The engine oil supply system according to claim 1, further comprising:
   a crankcase disposed above the oil pan;
   a crank shaft disposed in the crankcase and is jointed with a piston in a cylinder;
   an oil supply passage coupled to the oil pan and the crankcase;
   wherein the oil supply passage has an oil supply opening in the oil pan;
   wherein the oil supply opening downwards stretches into the oil pan from a cylinder block;
   wherein the oil supply passage has an oil nozzle on the inner wall of the cylinder.

* * * * *